United States Patent [19]

Gompper

[11] Patent Number: 4,627,937

[45] Date of Patent: Dec. 9, 1986

[54] PROCESS FOR DENITRATING NITRIC ACID AND ACTINIDE CONTAINING WASTE SOLUTIONS WHILE SIMULTANEOUSLY SEPARATING THE ACTINIDES

[75] Inventor: Klaus Gompper, Karlsruhe, Fed. Rep. of Germany

[73] Assignee: Kernforschungszentrum Karlsruhe GmbH, Fed. Rep. of Germany

[21] Appl. No.: 552,798

[22] Filed: Nov. 17, 1983

[30] Foreign Application Priority Data

Nov. 26, 1982 [DE] Fed. Rep. of Germany ....... 3243841

[51] Int. Cl.$^4$ .......................... G21F 9/04; G21F 9/10; B01D 21/01
[52] U.S. Cl. .................... 252/631; 210/729; 210/749; 210/903; 252/626; 252/634; 423/11; 423/12
[58] Field of Search ............... 252/631, 641, 634, 626; 423/11, 12, 15, 405, 390, 7; 210/749, 729, 903

[56] References Cited

U.S. PATENT DOCUMENTS

| | | | |
|---|---|---|---|
| 3,158,577 | 11/1964 | Bray et al. | 252/631 |
| 3,258,429 | 6/1966 | Weed | 252/631 |
| 3,673,086 | 6/1972 | Drobnik | 210/59 |
| 3,725,293 | 4/1973 | Haas | 252/631 |
| 4,025,602 | 5/1977 | Campbell et al. | 252/631 |
| 4,056,482 | 11/1977 | Schmieder et al. | 252/631 |
| 4,162,230 | 7/1979 | Horwitz et al. | 252/631 |
| 4,290,967 | 9/1981 | Campbell et al. | 252/627 |
| 4,364,859 | 12/1982 | Ohtsuka et al. | 252/643 |
| 4,421,533 | 12/1983 | Nishino et al. | 55/68 |
| 4,442,071 | 4/1984 | Lieser et al. | 252/631 |
| 4,490,336 | 12/1984 | Worthington et al. | 423/11 |

FOREIGN PATENT DOCUMENTS

| | | | |
|---|---|---|---|
| 1935273 | 4/1976 | Fed. Rep. of Germany . | |
| 2125915 | 12/1980 | Fed. Rep. of Germany . | |
| 2051704 | 4/1971 | France . | |
| 0089259 | 8/1978 | Japan | 210/903 |
| 0033365 | 3/1979 | Japan | 210/903 |
| 0110397 | 7/1982 | Japan | 210/903 |

OTHER PUBLICATIONS

Chemical Abstracts, vol. 50, 1956; I. A. Mirkin et al., col. 13576 g to i, and col. 13577 a.

R. C. Forsman et al., "Formaldehyde Treatment of Purex Radioactive Wastes" AEC-Report, HW-79622, Oct. 1963.

Helmut Richter et al., "Zerstörung des Salpetersäureüberschuss In Radioaktiven Abfallösungen und Verfestigung des Rückstandes Als Alkydharz" SGAE Report No. 2252 ST-23/74, Mar. 1974.

*Primary Examiner*—Stephen J. Lechert, Jr.
*Assistant Examiner*—Howard J. Locker
*Attorney, Agent, or Firm*—Sughrue, Mion, Zinn, Macpeak, and Seas

[57] ABSTRACT

A process for denitrating aqueous, nitric acid and salt containing waste solutions in which actinides are present, with simultaneous separation of the actinides, comprises agitating the waste solution at room temperature with diethyl oxalate and heating the resulting suspension to at least 75° C.

4 Claims, No Drawings

PROCESS FOR DENITRATING NITRIC ACID AND ACTINIDE CONTAINING WASTE SOLUTIONS WHILE SIMULTANEOUSLY SEPARATING THE ACTINIDES

BACKGROUND OF THE INVENTION

The present invention relates to a process for denitrating aqueous nitric acid and salt containing waste solutions in which actinides are present, while simultaneously separating the actinides.

In reprocessing irradiated and spent fuel and/or breeder elements there result aqueous, radioactive waste solutions which carry along a number of salts. Inter alia, these solutions contain actinide salts which must be removed from these solutions before further treatment of the waste solutions is effected, for example for the purpose of solidifying the radioactive fission nuclides. This removal of actinide salts could be done, for example, by precipitation with oxalic acid, if the solubility product of the actinide oxalates, e.g. plutonium oxalate, can be exceeded. However, this is possible only if the nitric acid, which is present in high concentration, is destroyed practically completely.

In the past, a series of denitration processes have been proposed to dispose of highly radioactive waste solutions. A few of these processes will be listed here:

R. C. Forsman and G. C. Oberg, describe, in a US-AEC report from the Hanford Works, HW-79622, October 1963, entitled "Formaldehyde Treatment of Purex Radioactive Waste", a denitration with formaldehyde.

S. Drobnik destroys nitric acid with formic acid, as disclosed in German Pat. No. 1,935,273 and corresponding U.S. Pat. No. 3,673,086.

L. A. Bray and E. C. Martin disclose denitration with sugar in U.S. Pat. No. 3,158,577.

W. Boccola and A. Donato denitrate with phosphorus, as disclosed in German Pat. No. 2,125,915.

H. Richter and H. Sorantin describe, in a report of the Austrian Studiengesellschaft für Atomenergie GmbH (in translation, Study Group for Atomic Energy) (Seibersdorf) SGAE Report No. 2252 ST 23/74, March 1974, the destruction of excess nitric acid in radioactive waste solutions with the aid of glycerin and the subsequent solidification of the residue as alkyd resin.

The above-listed processs have the following drawbacks:

In denitration with formaldehyde or formic acid, the nitric acid solution and denitration reagent cannot be mixed before the reaction since otherwise the denitration reaction would be too violent during heating. The denitration reagent must be added in measured quantities during the reaction. Separation of excess reagent is fraught with problems.

In denitration with sugar, sugar is added as an aqueous solution, and this adds to the volume of the waste solution.

In denitration with phosphorus, nonvolatile phosphoric acids are formed, inter alia, which remain in the denitrated solution.

In denitration with glycerin, the reaction exhibits an induction period as a function of temperature. Here again, the denitration reagent is added in measured quantities during the reaction.

SUMMARY OF THE INVENTION

It is an object of the present invention to substantially reduce the acid and nitrate content of nitric acid waste solutions.

Another object of the present invention is to provide such a process which reduces the total salt content in the waste solution and removes the actinides contained therein with the aid of a precipitation, and reduces the alpha radioactivity in the remaining solution without incurring the danger of violent reactions or an increase in volume of the waste solution.

Additional objects and advantages of the present invention will be set forth in part in the description which follows and in part will be obvious from the description or can be learned by practice of the invention. The objects and advantages are achieved by means of the processes, instrumentalities and combinations particularly pointed out in the appended claims.

To achieve the foregoing objects and in accordance with its purpose, the present invention provides a method for denitrating aqueous nitric acid and salt containing waste solutions in which actinides are present, comprising: agitating the waste solution at room temperature with diethyl oxalate, and heating the resulting suspension to at least 75° C.

It is to be understood that both the foregoing general description and the following detailed description are exemplary and explanatory, but are not restrictive of the invention.

DETAILED DESCRIPTION OF THE INVENTION

The practice of the present invention provides numerous advantages. Thus, in the present invention the nitric acid containing waste solution and the denitration reagent can be agitated together already at room temperature. The denitration reaction begins at about 75° to 90° C. Due to hydrolysis of the diethyl oxalate under the influence of the H+ ions forming oxalic acid and ethyl alcohol, the actinides (e.g. Pu, Am, Cm) are precipitated as oxalates simultaneously, i.e. during the denitration process. Instead of the two process steps required in prior art processes, the process according to the present invention requires only one step. The addition of only one reagent is required for the process according to the present invention. Moreover, a certain induction period for the desired reaction, such as in the denitration with glycerin does not occur in the process according to the present invention. Excess ethyl alcohol from the denitration reagent can be removed by distillation.

The joint precipitation and denitration reagent employed in the present invention is liquid, and therefore need not be dissolved before the denitration/precipitation process. This avoids an additional increase in volume of the waste solution.

It has been found that a mole ratio of less than 1:1 denitration reagent to nitric acid is sufficient for substantial denitration (preferred 0.25 to 1 denitration agent to 1 nitric acid).

Suitable ranges for the time of heating are 1 to 4 hours and for the heating temperature are 75° to 100° C. The concentration of nitric acid in the starting solution can be between 0.5 and 5 moles/l or more. The percentage of nitric acid which can be decomposed arises up to ca. 98%.

The aqueous actinides containing waste solutions which are treated can be, for example, a high level radioactive waste solution, or an intermediate level radioactive aqueous waste solution or a waste solution from the $PuO_2/UO_2$ fuel fabrication.

The present invention will now be described in greater detail with the aid of an example.

The following examples are given by way of illustration to further explain the principles of the invention. These examples are merely illustrative and are not to be understood as limiting the scope and underlying principles of the invention in any way. All percentages referred to herein are by weight unless otherwise indicated.

EXAMPLE

A round bottom flask with attached cooler, magnetic stirrer, thermometer and mushroom-shaped heater was employed to denitrate an aqueous nitric acid and salt containing solution. A first apparatus was employed in which the cooler was a Liebig cooler, and a second apparatus was employed in which the cooler was a reflux condenser.

A simulated, nitric acid containing waste solution was mixed with Cer(III) nitrate($Ce(NO_3)_3$) as the simulate for actinides and with diethyl oxalate (mole ratio $HNO_3$/diethyl oxalate=2:1). The initially cloudy solution (diethyl oxalate does not mix with the waste solution at room temperature) became clear when heated (hydrolysis of diethyl oxalate). At about 75° to 80° C., Ce oxalate was precipitated and gas began to develop.

The reaction solution began to boil and was further heated to about 95° to 100° C. and then kept at that temperature.

After cooling, the Ce oxalate precipitate was filtered out and the residual acid concentration in the filtrate was determined by titration with sodium hydroxide solution.

Two simulated waste solutions were subjected to the above described procedure. The compositions of the simulated waste solutions employed were as follows:

| Solution 1: | |
|---|---|
| $HNO_3$: | 1 mol/l |
| Na: | 81 g/l |
| Al, Ca, Cr, Cu, Fe, K, Mg, Mn, Mo, Ni, Ru, Zn, Cs, Sr: | 24 g/l (total) |
| nitrate: | 251 g/l |

| Solution 2: | | |
|---|---|---|
| Same as Solution 1, and additionally containing: Na oxalate, Na tartrate, Na citrate, $NaH_2PO_4$, NaF, and | | |
| EDTA: | 31 g/l (total) | (including 5.7 g/l Na) |
| TBP, DBP, kerosene: | 0.4 g/l (total) | |

The metals were used in the form of their nitrate salts.

Solution 1 was tested in the apparatus containing the Liebig cooler and in the apparatus containing the reflux condenser. Solution 2 was tested in the apparatus containing the reflux condenser.

The results of these tests are as follows:

(a) Solution 1:
Cooler: Liebig
Denitration reagent: Diethyl oxalate in a mole ratio of $HNO_3$ to diethyl oxalate of 2:1
Starting solution: 200 ml simulated waste solution

| Time [min] | 45 | 60 | 90 | 135 | 190 | 240 | 360 | 450 | 595 |
|---|---|---|---|---|---|---|---|---|---|
| % of orig. existing $HNO_3$ decomposed | 26 | 39 | 46 | 62 | 74 | 84 | 91 | 93 | 94.5 |

(b) Solution 2:
Cooler: Liebig
Denitration reagent: Diethyl oxalate in a mole ratio of $HNO_3$ to diethyl oxalate of 2:1
Starting solution: 200 ml simulated waste solution

| Time [min] | 45 | 60 | 90 | 120 | 180 | 240 | 360 |
|---|---|---|---|---|---|---|---|
| % of orig. existing $HNO_3$ decomposed | 37 | 58 | 70.5 | 80 | 86 | 93 | 98 |

(c) Solution 1:
Cooler: reflux
Denitration reagent: Diethyl oxalate in a mole ratio of $HNO_3$ to diethyl oxalate of 2:1
Starting solution: 200 ml simulated waste solution

| Time [min] | 90 | 180 | 240 |
|---|---|---|---|
| % of orig. existing $HNO_3$ decomposed | 75 | 95.5 | 95.5 |

It will be understood that the above description of the present invention is susceptible to various modifications, changes and adaptations, and the same are intended to be comprehended within the meaning and range of equivalents of the appended claims.

What is claimed is:

1. Process for denitrating aqueous nitric acid and salt containing waste solutions in which actinides are present, while simultaneously separating the actinides, comprising: agitating the waste solution with diethyl oxalate at room temperature, and heating the resulting suspension to at least 75° C.

2. A process according to claim 1, wherein the suspension is heated to a temperature of 95° to 100° C.

3. A process according to claim 1, where the mole ratio of diethyl oxalate to nitric acid is less than 1:1.

4. A process according to claim 1, where the mole ratio of diethyl oxalate to nitric acid is between 0.25 to 1 diethyl oxalate to 1 nitric acid.

* * * * *